Feb. 4, 1969 J. AGIN 3,426,210

CONTROL CIRCUIT FOR AUTOMATICALLY QUANTIZING SIGNALS AT DESIRED LEVELS

Filed Dec. 22, 1965 Sheet 1 of 3

INVENTOR.
JULIUS AGIN
BY John T. O'Halloran
Attorney

INVENTOR.
JULIUS AGIN
BY John T. O'Halloran
Attorney

INVENTOR.
JULIUS AGIN
BY John T. O'Halloran
Attorney

United States Patent Office 3,426,210
Patented Feb. 4, 1969

3,426,210

CONTROL CIRCUIT FOR AUTOMATICALLY QUANTIZING SIGNALS AT DESIRED LEVELS

Julius Agin, Pennsauken, N.J., assignor to Radio Corporation of America, a corporation of Delaware Filed Dec. 22, 1965, Ser. No. 515,595
U.S. Cl. 250—214 4 Claims
Int. Cl. H01j 39/12

ABSTRACT OF THE DISCLOSURE

An automatic quantizing circuit quantizes video signals at a predetermined level regardless of variations in the amplitude of the video signals.

*Background of the invention*

In certain optical character readers an electro-optical scanner, either directly or indirectly, scans with a plurality of scanlines characters that are printed on a document. The video signals derived from the scanner include character signal pulses produced by the interception of the outline strokes of the printed characters during trace scans, and blanking pulses produced during retrace at the end of each trace scan. In vertical scanning of the characters, the character signal pulses generated are of short duration when the strokes that are mainly horizontal are intercepted, and long when strokes that are mainly vertical are intercepted. The character signal pulses are essentially analog in form and at times exhibit signal strengths that vary from scanline-to-scanline because of uneven printing, variations in lighting, or other reasons. Since the basis for recognizing characters is the different character signal pulses produced when scanning different characters, it is important that the character signal pulses be clearly distinguishable in the video signal. Consequently, the character signal pulses are quantized to produce clearly discernible pulses having equal and relatively high amplitudes, as well as sharp leading and trailing edges.

In one character reader disclosed in a copending application entitled, "Optical Scanning System for Character Reader," for Seymour Klein, Ser. No. 237,949, now Patent No. 3,303,330, filed Nov. 15, 1962, and assigned to the same assignee as the present application, a variable quantizing level is utilized to quantize each scanline of the video signals at a fixed percentage of the peak signal strength of the character signal pulses therein. Such a variable quantizing level insures that all the character signal pulses in video signals having varying strengths are quantized but that low level noise signals or base line ripple are not quantized.

In the above-mentioned application, the peak level of the blanking pulses in the video signal is used as a reference from which to measure the quantizing level.

The peak level of the blanking pulses (the "black level" of the video signals) is the output of the scanner when blanked or nonconductive and is relatively constant. The base level of the blanking pulses is the base line "white level" of the video signal and is the output of the scanner when the margin or intercharacter space of a document is being scanned. The character signal pulses generated by a character begin at the white level base line and increase toward black level. The darker the print (i.e. the greater the contrast between the print and the document), the closer will the character signal pulses approach black level.

To prevent the blanking pulse amplitude from varying, an automatic gain control (AGC) circuit is incorporated into the above-mentioned character reader. However, when the scanner generates an entirely black scanline, the AGC circuits increase the gain so much that the system tends to overload on the next scanline having a white level therein. Such entirely black scanlines are produced, for example, by spacing marks that are deliberately made much higher in height than printed characters to space messages, or by large dirt marks, etc. To avoid such overloads, the AGC circuits are slowed down in responding to blanking pulse variations. Such slow AGC circuits therefore do not prevent the blanking pulse-to-base line amplitude from changing during individual scanlines when the reflectance of the document changes abruptly due to document texture changes, character background smudging, etc. Such varying blanking pulse levels make the AQC quantizing level inaccurate and may cause base line noise pulses to be quantized along with the character signal pulses to produce an incorrect video signal.

Accordingly, it is an object of this invention to provide an improved AQC circuit which quantizes at the correct level egardless of changes in the background reflectance of the characters on a document.

It is another object of this invention to provide an AQC circuit which avoids the necessity of providing a fast automatic gain control circuit to provide accurate recognition in a character reader.

A character reader embodying the invention scans characters printed on a document to produce video signals having character signal pulses and blanking pulses. The video signals are delayed for a period of one scanline and the nondelayed or direct video signals are utilized to establish a correct quantizing level for quantizing the delayed video signals at a fixed percentage of the peaks of the character signal pulses therein. A first clamping circuit clamps the direct video signals at a fixed level to provide character signal pulses having positive and negative peaks that are substantially equal when a normal video signal is being generated by the scanner in the character reader. A comparator circuit measures any differences between the positive and negative peaks of the clamped character signal pulses when an abnormal signal is generated by the scanner to provide a correction signal corresponding to this difference. The correction signal is then applied to a variable quantizing circuit to adjust the quantizing level so that each scanline of the delayed video signals remains quantized at a predetermined percentage of the peak strength of the character signal pulses. Thus, regardless of changes in the video signal, a correction signal is produced to compensate for such changes.

Figure 1:
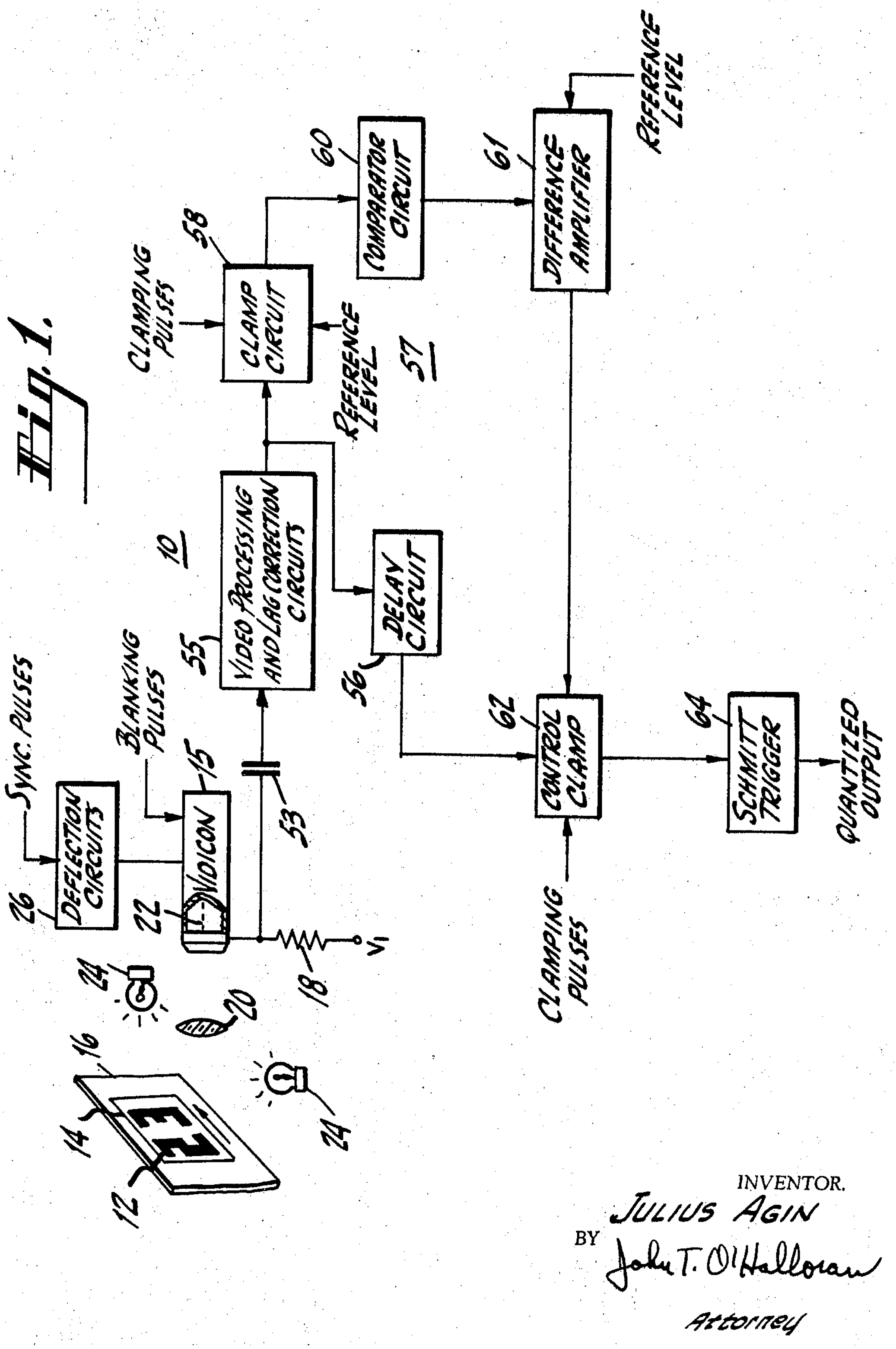
FIGURE 1 is a schematic block diagram of an AQC circuit embodying the invention.

In FIGURE 1, a character reader 10 reads characters 12 printed with dark ink on a light document 14. The document 14 is moved past an electrical optical scanner 15 by a document transport 16 which positions the document 14 so that the characters 12 are scanned by the scanner 15. The scanner 15 may, for example, comprise a vidicon tube which is biased from a positive potential source $V_1$ through a load resistor 18. The characters 12 are imaged onto the face of the scanner 15 by an optical lens system, shown schematically as a single convex lens 20, to be scanned by an electron beam 22 generated in the scanner 15. Light sources or lamps 24 provide both balanced and high levels of illumination of the characters 12 for the scanner 15.

The characters 12 are imaged consecutively onto the face of the scanner 15 due to the movement of the document 14, in the direction of the arrow shown thereon. The electron beam 22 in the scanner 15 is deflected vertically in a single line by deflection circuits 26. The vertical deflection of the electron beam 22 may, for example, be electrostatic and a deflection waveform to produce such a deflection is shown by the waveform 34 in line *b* of FIGURE 2. The horizontal movement of the document 14 at a uniform velocity and the vertical deflection of the character electron beam 22 in the single line effectively causes each character to be scanned substantially orthogonally. The deflection circuits 26 are synchronized by synchronizing (sync) pulses 36 shown in line *a* of FIGURE 2. The sync pulses 36 determine the period of a scanline. The sync pulses are generated by a timing generator (not shown) which also generates blanking 38, sampling 40, clamping 42, and discharge 44 pulses which are shown, respectively, in lines *c*, *d*, *e* and *f* of FIGURE 2. The use of these pulses will be described subsequently.

Figure 2:
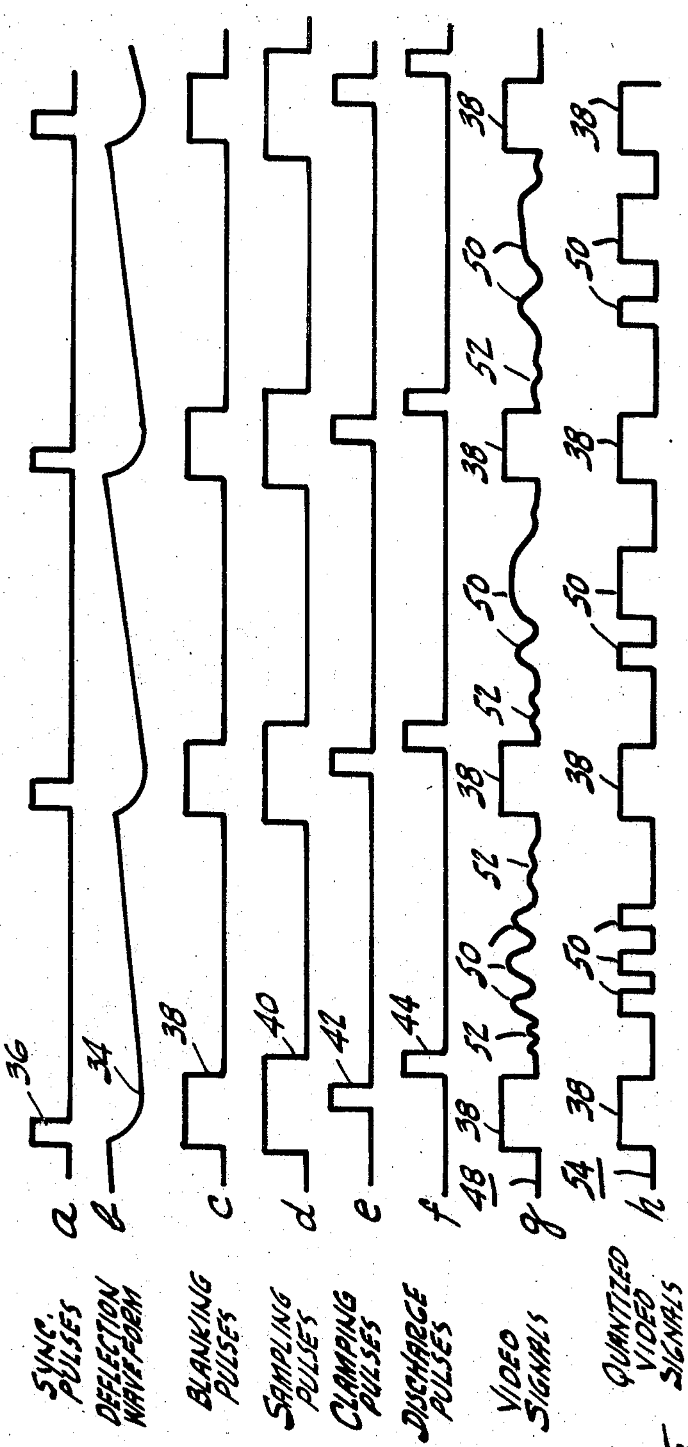
FIGURE 2 is a series of graphs showinug representative waveforms that occur at various places in the circuit of FIGURE 1.

The single line vertical scanning cycle of the electron beam 22 comprises a relatively slow trace scan that starts from an initial position above the character being scanned and ends at a terminal position below the character. The characters 12 are overscanned about 2½ times to compensate for any misalignment. The trace scan is followed by a rapid retrace back to the initial position. Periodic recurring blanking pulses 38 such as shown in line *c* of FIGURE 2 are applied to the scanner 15 during retrace to cut off the electron beam 22 during this time. The blanking pulses 38 begin slightly before the synchronizing pulses 36 and blank the scanner 15 during the entire retrace period.

The video signals derived from the scanner 15 include a plurality of scanlines which in totality comprise a character image signal. Typical scanlines 48 are shown in line *g* of FIGURE 2. These scanlines comprise the last three scans of the character "2" wherein the middle and left sides of this character are being scanned. Each scanline includes a blanking pulse 38 and character signal pulses 50. The peak amplitude of the blanking pulses 38 before processing is essentially the voltage level of the power supply $V_1$ and is the black level of the video signal scanlines 48. When the vidicon 15 is unblanked at the end of a blanking pulse 38, the reflectance of the light document above the character 12 causes an increased current flow through the load resistor 18 which establishes the base line of the video signal 48 or white level. The interception of the electron beam 22 with the image of a character reflected onto the face of the scanner 15 causes the character signal pulses 50 to be produced by a decrease in current through the load resistor 18. In the absence of any gain control circuits, the lighter the document 14 the lower will be the base line white level. The video signals 48 also include noise signals or base line ripple 52. It is desired to quantize the character signal pulses 50 without quantizing the noise pulses 52 so as to produce a quantized video signal 54 as shown in line *h* of FIGURE 2. The quantized video signal 54 has clearly discernible character signal pulses 50 with no noise signals and is therefore the desired form to recognize the character read.

Referring back to FIGURE 1, the video signals from the scanner 15 are coupled through a capacitor 53 and applied to a video processing circuit 55 wherein amplification, D.C. restoration and lag correction occurs. The processed video signals are then divided into a direct video signal and a delayed video signal. The delayed video signal is delayed in a delay circuit 56 which delays the video signals for one scan time to permit a "pre-look" circuit 57 to examine the direct or non-delayed video signals so as to establish the correct quantizing level before the delayed video signals arrive at the quantizing circuit. The direct video signals are applied to a clamp circuit 58 in the pre-look channel 57. The clamp circuit 58 clamps the character signal pulses at substantially their midpoint to produce a video signal having positive and negative pulses that are substantially balanced about the zero or ground reference point as shown in the second half of line *a* of FIGURE 3. The clamp circuit 58 is activated periodically by the clamping pulses 42 to clamp the blanking pulses 38 to a predetermined reference level. The reference level is selected to cause normal character signal pulses 50 to be balanced about the zero axis with substantially equal but opposite positive and negative peaks. The clamping pulses 42 clamp during the latter portion of the blanking pulses 38 to allow any initial transients in the blanking pulses 38 to disappear. A clamping circuit 57 which may be utilized is disclosed in a copending application entitled "Clamping Circuit" for Thomas W. Ritchey, Jr., Ser. No. 317,281, now Patent No. 3,246,080 filed Oct. 18, 1963, and assigned to the same assignee as the present application.

The substantially balanced bipolar video signal produced by the clamping circuit 58 is applied to a comparator circuit 60. The comparator circuit 60 detects the peak values of the positive and negative portions of the bipolar video signal and determines the midpoint between these opposite peaks to provide a correction signal if they are unequal. The correction signal is applied to a difference circuit, such as a difference amplifier 61, along with a reference level. The correction signal is subtracted from the reference level to provide a variable control clamping reference level for a control clamping circuit 62. The control clamping circuit 62 is also connected to the delay circuit 56 to clamp the delayed video signal to the control clamping reference level so that the signal may be properly quantized. The delayed video signal is then applied to a trigger circuit 64, which may be a Schmitt trigger, for quantizing.

Figures 3, 4:
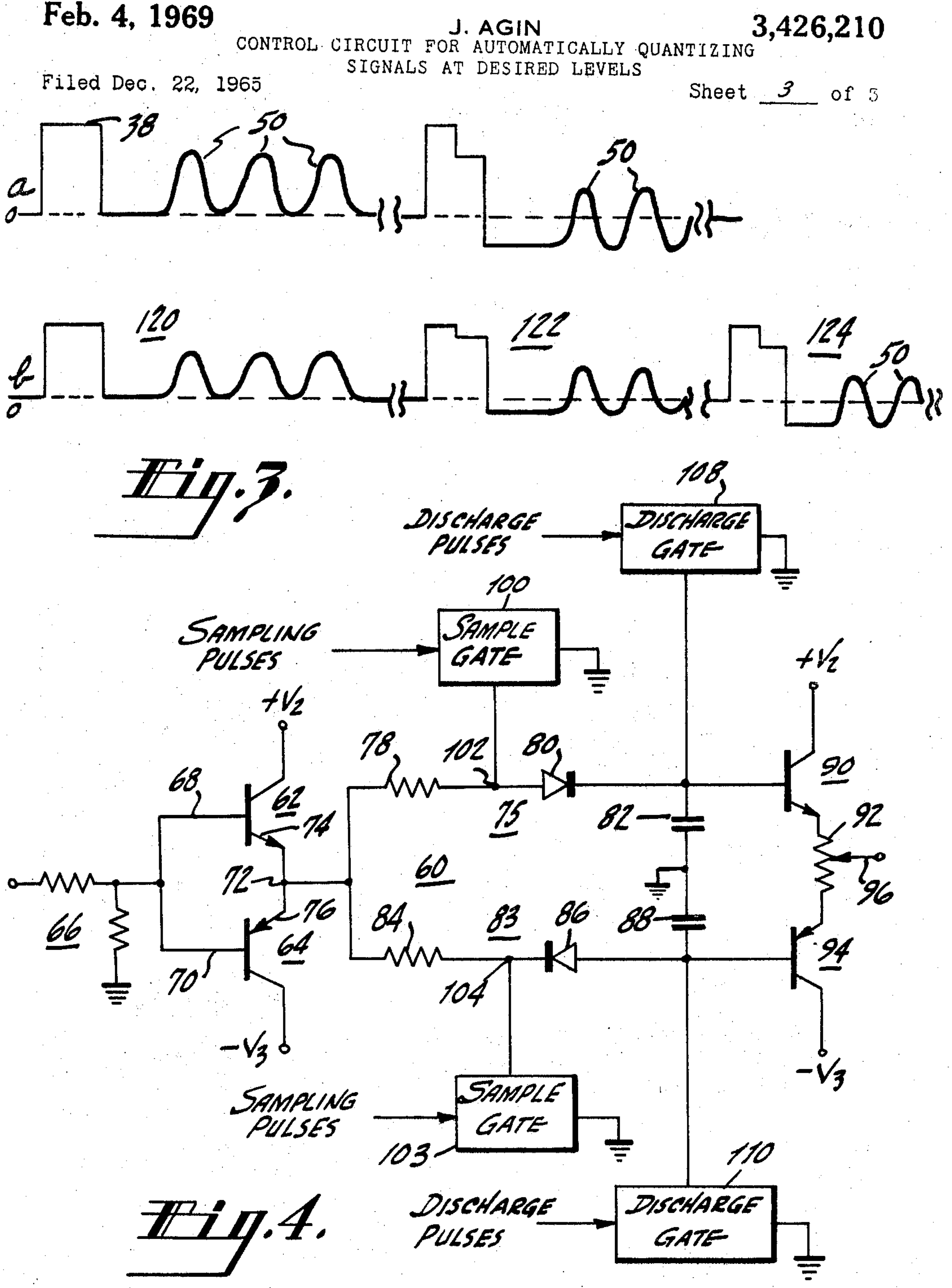
FIGURE 3 is a series of graphs illustrating the operation of the circuit of FIGURE 1; and, FIGURE 4 is a schematic circuit diagram of a comparator circuit utilized in the system of FIGURE 1.

A comparator circuit 60 that may be utilized in the prelook circuit 57 is shown in schematic form in FIGURE 4. The comparator circuit 60 includes a pair of NPN and PNP complementary transistors 62 and 64, respectively, that are coupled serially between positive and negative voltages. The bipolar video signal from the clamp circuit 58 is applied through a voltage divider 66 to the bases 68 and 70 of the transistors 62 and 64, respectively. The common junction 72 of the emitters 74 and 76 of the transistors 62 and 64, respectively, is coupled to a positive peak detector 75 that includes the serial combination of a resistor 78, a forwardly poled diode 80 and a capacitor 82 connected between the junction 72 and ground. Similarly, the junction point 72 is also connected to a negative peak detector 83 that includes the serial combination of a resistor 84, a backwardly poled diode 86 and a capacitor 88 connected between the junction point 72 and ground. The ungrounded plate of the capacitor 82 is coupled to the base of an NPN transistor 90 that has its collector coupled to a positive potential source and its emitter coupled to one terminal of a potentiometer 92. Similarly, the ungrounded electrode of the capacitor 88 is connected to the base of a PNP transistor 94 that has its collector connected to a negative potential source and its emitter coupled to the other terminal of the potentiometer 92. The movable arm 96 of the potentiometer 92 provides the output of the comparator circuit 60. The potentiometer 92 functions as a balance detector in the comparator circuit 60 and the movable arm 96 is adjusted to produce a zero output when the positive and negative peaks in the bipolar input. signal are equal in amplitude.

A first sample gate 100 is coupled to the junction 102 of the resistor 78 and the anode of the diode 80 in the positive peak detector 75 to connect to ground the junction point 102 when the sample gate 100 is activated by a sampling pulse 40 applied thereto. This prevents the positive peak detector 75 from detecting the peaks of the blanking pulses in the bipolar video signal. Similarly, a second sample gate 103 is coupled to the junction 104 of the resistor 84 and the cathode of the diode 86 in the negative peak detector 83 to connect to ground the junction point 104 when the sample gate 103 is activated by a sampling pulse 40. This prevents the negative peak detector 83 from charging up on the negative peaks of the blanking pulses 38. A first discharge gate 108 is coupled to the ungrounded electrode of the capacitor 82 to discharge to ground the charge on the capacitor 82 when the gate 108 is activated by a discharge pulse. A discharge pulse 44, as shown in FIGURE 2, is generated at the beginning of each scanline. Thus, the capacitor 82 is prepared to receive a new peak charge on each scanline. Similarly, a second discharge gate 110 is coupled to the ungrounded electrode of the capacitor 88 to discharge to ground the charge on the capacitor 88 when the gate 110 is activated by a discharge pulse 44 at the beginning of each scanline.

In describing the operation of the character reader 10, it will be assumed that the video signals derived from the processing circuits 54 in scanning a portion of a character is similar to that shown by the first half of a line *a* in FIGURE 3. It is desirable to quantize such a signal at a predetermined percentage of the character signal pulse peaks 50 regardless of changes in these peaks or in the background reflectance of the document 14 from scan-to-scan. To accomplish this, the video signal is delayed for a period of one scanline before quantizing so that sufficient time is available to look at the direct or non-delayed signal to determine the correct reference level for quantizing the delayed signal. One desirable quantizing level has been found to be 50% of the peak amplitude of the character signal pulses 50 and the operation of the AQC circuit is described in this context. Such a quantizing level insures that the base line ripple, which is less than half of the amplitude of the character signal pulses 50, is eliminated from the quantized signal.

The reference level applied to the clamp circuit 58 clamps the blanking pulses at a point such that the character signal pulses 50 are converted to pulses having positive and negative peaks that are balanced about ground, as shown in the second half of line *a* of FIGURE 3. Such a bipolar signal from the clamp circuit 58 causes the transistors 62 and 64 (FIGURE 4) to conduct alternately on the positive and negative peaks of this signal. The sample gates 100 and 103 shunt to ground the output of these transistors during the sample pulse period to prevent the detection of the peaks of the blanking pulses 38. Also during the sampling pulse period, the discharge gates 108 and 110 are activated to discharge the capacitors 82 and 88 to prepare them for the receipt of the character signal pulses 50. At the end of the sampling and discharge pulse periods, the gates 100, 103, 108 and 110 open and are effectively disconnected from the circuit.

The positive portions of the character signal pulses 50 cause the transistor 62 to conduct and the capacitor 82 is charged, turning on the transistor 90. Similarly, the negative peaks of the character signal pulses 50 cause the transistor 64 to conduct, charging the capacitor 88 and turning on the transistor 94. The voltage levels appearing at opposite ends of the balance detector potentiometer 92 are substantially equal to the peak values of the positive and negative peaks of the pulses 50. Since these peaks have been assumed equal, there is no correction signal output from the center tap 96 of the potentiometer 92.

The absence of a correction signal causes the difference amplifier 61 in FIGURE 1 to transfer unchanged the reference level input thereto over to the control clamp 62. Since this reference level is the same as that applied to the clamp circuit 58, the delayed video signal from the delay circuit 56 is clamped as shown in the second half of line *a* of FIGURE 3. Such a clamped signal is applied to the trigger circuit 64 which conducts when the clamped signal goes positive. The trigger 64 produces uniform amplitude pulses having sharp rise and fall times when conductive. Thus, quantized video signals as shown in line *h* of FIGURE 2 are produced. No base line ripple occurs in such signals.

If the background of a character gets darker due to a smudge, or other reasons, the peak-to-base line values of the blanking pulses 38 and character signal pulses 50 decrease. Such a change is shown by the scanline 120 of line *b* of FIGURE 3. When such a direct signal is applied to the clamp circuit 58, the signal is clamped as shown in the scanline 122 of line *b* of FIGURE 3 because the reference level applied to the clamp 58 is constant. The positive peaks of this clamped signal are now greater than the negative peaks thereof and when applied to the comparator circuit 60 (FIGURE 4) cause the upper terminal of the balance detector 92 to exhibit a greater absolute magnitude than the lower terminal thereof. The center tap 96 is therefore shifted from zero to a potential level equal to the midpoint between the positive and negative peak values. A positive correction signal is therefore applied to vary the variable quantizing level. The positive correction signal is subtracted from the reference level input to the difference amplifier 61 (FIGURE 1) to reduce the level at which the control clamp 62 clamps the delayed video signal. This reduction is shown by the scanline 124 of FIGURE 3. It is to be noted that zero now occurs at the midpoint in the character signal pulses 50 and the Schmitt trigger 64 will again quantize these signals at their 50 percentile point.

If the reflectance of the document changes in an opposite manner, a negative correction signal is generated to shift the quantizing level in the proper direction. Similarly, if the peaks of the character signal pulses 50 increase or decrease, the quantizing level also shifts to counteract these changes.

Thus, in accordance with the invention, an automatic quantizing control circuit is provided to quantize video signals at a predetermined percentage of their peak amplitude regardless of changes in their signal strength or in the reflectance of the document. Such an AQC control circuit eliminates the need for a fast and expensive AGC circuit in a character reader.

What is claimed is:

1. An automatic quantizing control circuit for a character reader having means to scan by a plurality of scanlines characters printed on a document to generate video signals including blanking pulses and character signal pulses, comprising in combination,
   - a delay circuit coupled to said scan means for delaying direct video signals to provide delayed video signals that are delayed for a period of one scanline,
   - clamping means coupled to said scan means for clamping said direct video signals so as to provide character signals that are substantially balanced about a reference level,
   - comparator means for comparing said character signal peaks of said direct video signal to generate a correction signal when they are unequal,
   - variable quantizing means coupled to said delay circuit for quantizing said delayed video signals at a predetermined point of the character signal peak strength, and
   - means for applying said correction signal to vary said quantizing point to account for variations in said video signals.

2. An automatic quantizing control circuit in accordance with claim 1 wherein said clamping means clamps said direct video signal so as to provide character signal peaks that are substantially equal but opposite in polarity.

3. An automatic quantizing control circuit in accordance with claim 2 wherein said comparator means includes a positive peak detector for detecting the peak of the positive character signals,
   - a negative peak detector for detecting the peak of the negative character signals, and
   - a balance detector coupled between said positive and negative peak detectors to detect the midpoint between said positive and negative peaks to provide a correction signal when they are unequal.

4. An automatic quantizing control circuit in accordance with claim 3 wherein said variable quantizing means includes a difference circuit coupled to said balance detector for subtracting said correction signal from a reference signal based on the amplitude of said blanking pulses to provide a control signal, a control clamping circuit coupled between said difference circuit and said delay circuit to clamp the blanking pulses in said delayed video signal to said control signal level so as to clamp said character signal pulses at a predetermined point of their peak signal strength, and a trigger circuit coupled to said clamping circuit to quantize said clamped video signal to provide equal amplitude pulses.

References Cited

UNITED STATES PATENTS

| | | | |
|---|---|---|---|
| 2,944,217 | 7/1960 | Greanias | 328—2 |
| 2,947,975 | 8/1960 | Brown | 328—13 |

RALPH G. NILSON, *Primary Examiner*.

T. N. GRIGSBY, *Assistant Examiner*.

U.S. Cl. X.R.

250—219; 307—260; 328—2, 14, 31; 340—146.3